March 30, 1943.   E. P. ZELNIS   2,314,963
AUTOMATIC AIR VENT VALVE
Filed May 28, 1940
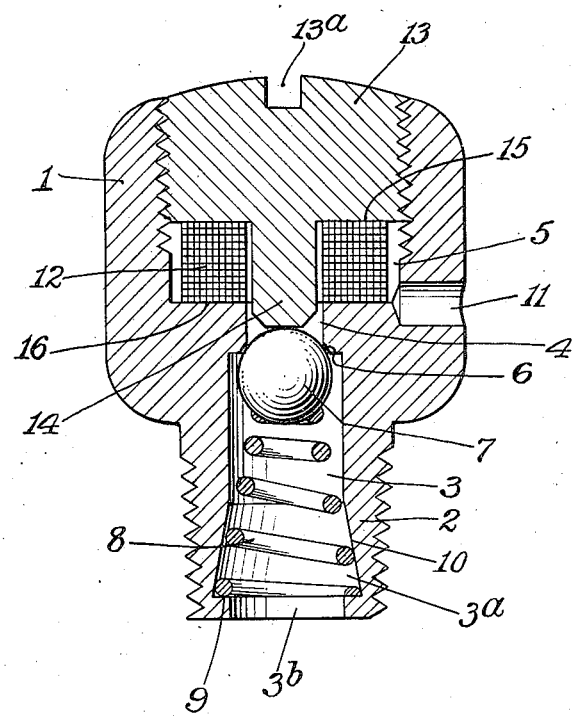
Inventor.
Edward P. Zelnis.
by Parker & Carter
Attorneys.

Patented Mar. 30, 1943

2,314,963

UNITED STATES PATENT OFFICE 2,314,963

AUTOMATIC AIR VENT VALVE

Edward P. Zelnis, Chicago, Ill., assignor to The Dole Valve Company, Chicago, Ill., a corporation of Illinois Application May 28, 1940, Serial No. 337,643

2 Claims. (Cl. 137—122)

This invention relates to automatic air vent valves and has for its object to provide a new and improved valve of this description.

The invention has as a further object to provide an automatic air vent valve particularly adapted for use in connection with hot water heating sysems. In hot water heating systems air accumulates in the radiators. In view of the fact that water is continually circulating through the radiators, the radiators being substantially full of water, the ordinary steam radiator air vent is not adaptable. One of the objects of the present invention is to provide an automatic air vent which is arranged so that it will automatically vent the air from the hot water heating system radiators and will at the same time prevent the escape of the water. The invention has as a further object to provide a device of this kind which stops the escape of the water by hygroscopic material enclosed in the valve and arranged so that this hygroscopic material may be removed and replaced while the valve is in position on the radiator and without permitting the escape of water from the radiator.

The invention has other objects which are more particularly pointed out in the accompanying description.

Referring now to the drawing, there is illustrated an air vent valve having a casing 1 with a threaded nipple 2 by means of which it is attached to the radiator. This nipple is provided with a passageway 3 which communicates by a passageway 4, smaller in diameter, with a chamber 5 in the casing. There is a valve seat 6 at the point where the passageway 3 connects with the passageway 4. Within the passageway 3 is a valve member 7 which may be of any suitable form and is here shown as a ball valve member. Within the passageway 3 there is elastic means for elastically pressing this valve member against the seat 6, such means being herein shown as a spring 8. The spring 8 is held in position in any desired manner, as by means of a shoulder 9 connected with the nipple 2 and which the end of the spring engages. This shoulder may be integral with the nipple 2, as shown.

The passageway 3 is provided with the enlargement 3a near its outer end near the shoulder 9, having its greater diameter near the shoulder and being provided with an outwardly diverging wall 10. The passageway has the portion 3b beyond the shoulder 9, smaller in diameter than the portion 3a. The spring 8 is preferably in the form of a spiral spring having its lower end engaging the shoulder 9 and its convolutions decreasing in diameter from the shoulder toward the valve member. The valve member 7 is first inserted and then the spring inserted, the spring being twisted to decrease its diameter, so that it can be pushed through the part 3b of the passageway and when its end gets beyond the shoulder 9, it expands and engages the shoulder, so as to hold it and the valve member in position. The spring and valve member may be of any desired material, but I prefer to have them made of bronze.

The casing 1 is provided with one or more vent openings 11 which communicate with the chamber 5. Located in the chamber 5 is the hygroscopic material 12 which may be in any desired form and of any suitable hygroscopic material, that is material that expands when wet and contracts when dry. I prefer to have this material in the form of a washer with a central opening therethrough.

Within the chamber 5 of the casing is a closing plug 13 which preferably has a screwthreaded engagement with the casing. This plug has a valve engaging member 14 which extends through the hygroscopic material 12 and into the passageway 4 and which has a shoulder 15 which engages the hygroscopic material, so that when inserted the proper amount in the casing, it confines the hygroscopic material between the shoulder 15 and the shoulder 16 on the casing. This valve engaging member 14 is of such length that when in proper position so that the hygroscopic material when dry will let the air pass, the member 14 engages the valve member 7 and holds it the proper distance from its seat 6, compressing the spring 8, so that there is an open passageway from the radiator through the passageway 3 and passageway 4 and the vent opening 11. It will be seen that the plug 13 and projection 14 and resilient means 8 cooperate to form an adjusting device for adjusting the position of the valve member 7 with relation to its seat so as to vary the size of the opening leading from the inlet passageway to the chamber 5 and that the movement of the plug to adjust the valve member 7, simultaneously varies the compression upon the hygroscopic material 12 so that the proper adjustment between the amount of hygroscopic material and the size of the opening controlled by the valve member to permit the escape of air and to prevent the escape of water through the device may be ascertained. This will be readily seen by considering the parts as they are being assembled. Before the plug 13 is placed in position the valve member 7 is contacting its seat 6 so as to completely close the connection between the passageway 3 and the chamber 5 and vent openings 11. The hygroscopic material 12 is then placed in position in the chamber 5 and the plug 13 with its valve engaging member 14 is screwed into the casing 1. The shoulder 15 on the plug 13 engages the hygroscopic material and compresses it against the shoulder 16 of the casing.

The valve engaging member 14 then contacts the valve member 7. At this time the opening controlled by the valve member is completely closed. A further movement of the plug 13 causes the valve engaging member to move the valve member 7 and simultaneously vary the compression upon the hygroscopic material. The plug 13 may be moved in or out until the proper adjustment is secured.

A proper amount of hygroscopic material must be placed in the chamber 5 so that when properly compressed the valve member 7 is spaced a short distance from its seat so as to control the flow of the water into the chamber 5. The closing plug 13 is provided with some means by which it may be moved through the agency of a tool. As herein shown, there is a slot 13a for this purpose.

The use and operation of my invention are as follows.

When the device is attached to a hot water radiator, the parts are in assembled position substantially such, for example, as is shown in the drawing. When water is inserted in the radiator it drives out the air and the air passes out through the air vent 11. When the radiator is filled with water some of the water passes through the passageway 3 and into the passageway 4 and contacts with the hygroscopic material 12, causing this material to swell and close off any passage of water from the radiator out through the air vent 11. When air accumulates in the radiator, so that air is in contact with the hygroscopic material, this material then dries out and opens up the connection to the outside atmosphere so as to let the air escape. When the water contacts with the hygroscopic material the escape of water is prevented.

When it is desired to have access to the hygroscopic material, as, for example, to remove it or replace it, the closing plug 13 is unscrewed. After the valve engaging member 14 has moved a comparatively short distance, the valve member 7 is automatically moved to its seat by the spring 8 so as to close the passageway 4 and prevent the escape of water through the air vent 11. The plug 13 may then be entirely removed and the hygroscopic material removed and replaced and any other action desired taken. When the hygroscopic material is replaced or a new portion thereof put in position, the plug 13 is then inserted and screwed down until the valve member 7 is opened.

I claim:

1. An automatic air vent valve for hot water radiators comprising a casing having a chamber therein, an air vent connecting said chamber with the outside atmosphere, a passageway leading from the chamber to the exterior of the casing and having an enlarged outer portion with an outwardly diverging wall, a shoulder at the end of the enlarged portion of the passageway, a valve member in said passageway, a seat for said valve member, a spring in said passageway which presses said valve member toward said seat, said spring engaging said shoulder, hygroscopic material in said chamber so arranged as to control flow through said casing, a removable closing plug in said chamber, and a valve engaging member on said closing plug which projects past the hygroscopic material and which engages said valve member to hold it from its seat during normal operation of the device so that air may escape through said casing and water be prevented from escaping therethrough.

2. An automatic air valve vent device comprising a casing having a chamber therein, an air vent connecting said chamber with the outside atmosphere, an inlet passageway connecting with said chamber, a movable valve member in said casing located in said inlet passageway, a seat for said valve member, resilient means engaging said valve member for resiliently pressing it towards its seat, hygroscopic material located in said chamber and having an opening extending therethrough, an adjustable imperforate plug in said chamber, shoulders on said casing and said plug engaging said hygroscopic material and between which said hygroscopic material is compressed, a projection connected with said plug and extending through said opening and engaging said valve member, said plug and projection and resilient means forming an adjusting device for adjusting the position of said valve member with relation to its seat so as to vary the size of the opening leading from the inlet passageway into said chamber, the movement of said plug to adjust said valve member simultaneously varying the compression upon said hygroscopic material, so that the proper adjustment between the amount of hygroscopic material and the size of the opening controlled by said valve member to prevent the escape of water through the device may be ascertained.

EDWARD P. ZELNIS.